United States Patent [19]

Chang et al.

[11] Patent Number: 4,853,461

[45] Date of Patent: Aug. 1, 1989

[54] METHOD OF ISOLATING COPOLYMERS OF VINYLPYRIDINE AND STYRENE

[75] Inventors: Yeong-Ho Chang; Waylon L. Jenkins, both of Kingsport, Tenn.

[73] Assignee: Eastman Kodak Company, Rochester, N.Y.

[21] Appl. No.: 207,075

[22] Filed: Jun. 13, 1988

[51] Int. Cl.$^4$ ............................................. C08F 6/18
[52] U.S. Cl. .................................. 528/486; 528/490; 528/503; 523/335
[58] Field of Search ...................... 528/486, 490, 503; 523/335

[56] References Cited

U.S. PATENT DOCUMENTS

| | | | |
|---|---|---|---|
| 2,830,975 | 4/1958 | Irvin | 260/82.1 |
| 3,501,447 | 5/1970 | Pieper et al. | 528/486 X |
| 4,593,082 | 6/1986 | Dombroski et al. | 526/216 |
| 4,647,652 | 3/1987 | Eichenauer et al. | 528/486 |

FOREIGN PATENT DOCUMENTS 0176642  4/1986  European Pat. Off. ............ 528/486

*Primary Examiner*—Joseph L. Schofer
*Assistant Examiner*—F. M. Teskin
*Attorney, Agent, or Firm*—John F. Stevens; William P. Heath, Jr.

[57] ABSTRACT

Disclosed is a process for isolating copolymers comprising repeating units from 2-vinylpyridine and styrene by drowning the reaction emulsion into an acetic acid solution or by adding an acetic acid/water solution to the reaction emulsion. The copolymer isolated by this technique filters and washes much more rapidly than the copolymer isolated using sodium chloride, and the wet cake has a high solids content.

7 Claims, No Drawings

METHOD OF ISOLATING COPOLYMERS OF VINYLPYRIDINE AND STYRENE

TECHNICAL FIELD

This invention relates to a process for isolating copolymers comprising repeating units from 2-vinylpyridine and styrene by drowning the reaction emulsion into an acetic acid solution or by adding an acetic acid/water solution to the reaction emulsion. The copolymer isolated by this technique filters and washes much more rapidly than the copolymer isolated using sodium chloride, and the wet cake has a high solids cotent.

BACKGROUND OF THE INVENTION

Copolymers of 2-vinylpyridine and styrene are known for use as a pH-sensitive coating for orally administrable drugs, nutrients, and medicaments, particularly for the ruminants (U.S. Pats. Nos. 4,177,255, 4,181,708, 4,181,709, 4,181,710). These polymers when prepared by emulsion polymerization are generally precipitated by drowning into sodium chloride solution. Our experience has shown that the filtration and washing of the cake is slow and that the wet cake has % solids of about 30–35%. The low solids and the face that such cake is thixotropic makes the drying process difficult. Furthermore, solubility problems have been experiencd during the coating process which were traced to excessive NaCl left from the wet cake.

A typical procedure for isolating copolymer of 2-vinylpyridine and styrene calls for drowning the reaction emulsion into a sodium chloride/water solution. This affords a product that is small in particle size and filters and washes slowly. The wet cake produced from such work-up generally has about 30 to 35% solids. A method that improves the filtration, washing, and % solids of the wet cakes also saves time in the subsequent drying.

A procedure is disclosed in U.S. Pat. No. 2,830,975 whereby a polymer s coagulated with an acidic material, such as sulfuric acid, hydrochloric acid, acetic acid, or the like. A highly ionizing acid is preferred. One method of effecting coagulation is to pass separate streams of the latex and coagulant to a coagulating vessel. Another method comprises blending separate streams of the latex and coagulant just prior to the entrance of the combined streams into the coagulating vessel. The materials are agitated during coagulation and the pH of the serum is preferably maintained below a pH of about 4.

DESCRIPTION OF THE INVENTION

According to the present invention, there is provided a method of isolating copolymer comprising repeating units from vinylpyridine and styrene from an aqueous emulsion of the copolymer which comprises mixing the aqueous emulsion with an acidic material such that the mixture has a pH of about 4–8 to aggregate the copolymer, and heating the resulting slurry containing the aggregated copolymer to a temperature of about 55°–100° C. for about 10–120 minutes to increase the size of the aggregated particles.

The method uses an acid in place of sodium chloride to break the reaction emulsion after the emulsion polymerization of the said polymer. The product isolation can be done by adding acid/water solution to the emulsion or by drowning the emulsion in an agitated solution of acid water such that the end pH is from about 4 to 8.

The aggregated product slurry becomes finely divided particles after heating from about 55° C. to 85° C. for about 10 minutes to 2 hours. A temperature of lower than 55° C. does not provide good particle size for easy filtration and washing. A temperture of greater than 85° C. tends to ball up the product to an unmanageable gum. The time of heating does not appear to be very critical but longer heating provides no advantages. As an example, for 65/35 poly(2-vinylpyridine-co-styrene), the preferred pH after breaking the emulsion with acetic acid is from 6 to 8. The preferred temperature is from 70° C. to 80° C., and the preferred time is from 10 minutes to 30 minutes. Such product can be filtered and washed in a much shorter time than that worked up in a sodium chloride solution. The wet cake prepared from such a process generally has about 70–95% solids and can be dried much more readily than the conventional sodium chloride workup. An additional advantage is that no material is introduced which could cause solubility problems during the coating process.

The invention is useful in reducing the manufacturing cost of the poly(2-vinylpyridine-co-styrene) and the polymer is useful as a coating for drugs, nutrients, and medicaments orally administrable to ruminants.

The copolymer isolated according to the method of the present invention preferably is poly(2-vinyl-pyridine-co-styrene), which is produced in an equeous emulsion thereof by techniques, e.g., according to the teachings of U.S. Pat. No. 4,593,082. The copolymer may contain repeat units from other monomers in addition to vinylpyridine and styrene, and the term copolymer as used herein is intended to include such polymers.

Preferably the acidic material used in the isolation process is a water-soluble inorganic acid, or a $C_1$–$C_4$ carboxylic acid. The preferred water-soluble organic acid is acetic acid. Examples of other suitable carboxylic acids include formic acid, propionic acid, butyric acid and isobutyric acid.

The copolymer of vinylpyridine and styrene is produced by the well-known latex system (U.S. Pat. No. 4,593,082) which results in the copolymer being in an aqueous emulsion. The first step of the present process is to mix the emulsion with one of the acids described above until the mixture has a pH or about 4–8, preferably about 6–8. Such lowering of the pH causes the copolymer to aggregate. The resulting slurry containing the aggregated or precipitated copolymer is then heated by conventional means to a temperature of about 55°–100° C. (preferably about 65°–85° C.) for about 10–120 minutes (preferably about 10–20 minutes) during which time the size of the aggregated particles is increased.

The following examples are submitted for a better understanding of the invention.

Examples 1a, 1b and 1c illustrate the high solid content obtained from the wet cake isolated by acid work-up according to this invention.

EXAMPLE 1a

Preparation Of 65/35 2-Vinylpyridine/Styrene Monomers

A mixture of 2-vinylpyridine (650 g) and styrene (350 g) is washed twice with 5% NaOH in water (each 320 mL) and twice with water (each 640 mL) to remove the inhibitors. The monomers which contain some residual water have a volume of 1039 mL and are used in b below.

EXAMPLE 1b

Preparation of 65/35 Poly(2-Vinyl-pyridine-co-styrene) Emulsion

The pre-washed 65/35 2-vinylpyridine/styrene (1000 g from 1), pre-mixed 5% sodium oleate (33 g sodum oleate in 660 mL of distilled water), 50% NaOH (30.0 g) and distilled water (5340 mL) are charged into a 10-liter 3-neck flask equipped with a mechanical stirrer, thermometer and a condenser. The reaction mixture is purged with nitrogen and sodium persulfate (5.0 g) is added. The reaction is heated to 55° C. under nitrogen and the reaction is maintained at 55° C. for 8 hours. The reaction emulsion at this point has a pH of 12.9. The batch is divided into four equal parts, of which one is worked up as c.

EXAMPLE 1c

Work-up by Acetic Acid

An emulsion equivalent to 250 g polymer from b is added to an agitated solution of acetic acid (10 g) and distilled water (600 mL) in a 5000 mL 3-neck flask equipped with a mechanical stirrer and a condenser. The emulsion breaks into a thick slurry of cottage-cheese like product with a pH of 8.1. The reaction mixture is heated to and maintained at 80° C. for 15 minutes. The batch is cooled to room temperature over 2-4 hours. The product is filtred on a 25 cm Büchner funnel with house vacuum and washed with distilled water (6000 mL). The filtration is nearly instantaneous and the washing takes 1 minute and 14 seconds. The wet cake is pulled further on the Büchner funnel for 3 hours to give solids of 76.1%. The cake is dried in a 55° C. oven to give 241.0 g white powder (96.4% yield) with an inherent viscosity of 1.165.

Examples 2a, 2b and 2c are submitted for reference. They illustrate the low solid content of wet cake isolated by the conventional sodium chloride work-up.

EXAMPLE 2a

Preparation of 65/35 2-Vinylpyridine/styrene Monomers

Same procedure as in Example 1a is followed.

EXAMPLE 2B

Prepration of 65/35 Poly(2-vinyl-pyridine-co-styrene) Emulsion

Same procedure as in Example 1b is followed.

EXAMPLE 2C

Work-up by Sodium Chloride/Water

An emulsion equivalent to 250 g polymer from b is added to an agitated solution of sodium chloride (48 g) and distilled water (600 mL) in a 5000 mL 3-neck flask equipped with a mechanical stirrer and a condenser. The emulsion breaks into a thick slurry of cottage-cheese like product. The reaction mixture is heated to and maintained at 80° C. for 15 minutes. The batch is cooled to room temperature over 2-4 hours. The product is filtered on a 25 cm Büchner funnel with house vacuum and washed with distilled water (6000 mL). The filtration takes 3 minutes 39 seconds and the washing takes 46 minutes 29 seconds. The wet cake is pulled on the Büchner funnel for 3 hours to give solids of 39.85. The cake is further dried in a 55° C. oven to give 250.0 g white powder (100% yeild) with an inherent viscosity of 1.132.

Inherent viscosity (I.V.) is determined in a 60/40 mixture (wt/wt) phenol/tetrachloroethane at 25° C. at a concentration of 0.5 gram polymer per 100 mL.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

We claim:

1. The method of isolating of copolymer comprising repeat units from vinylpyridine and styrene from an aqueous emulsion of said copolymer which comprises mixing said aqueous emulsion with an acidic material such that the mixture has a pH of about 4–8 to aggregate the copolymer, and heating the resulting slurry containing the aggregated copolymer to a temperature of about 55°–100° C. for about 10–120 minutes to increase the size of the aggregated particles.

2. The method according to claim 1 wherein the copolymer is poly(2-vinylpyridine-co-styrene).

3. The method according to claim 1 wherein the acidic material is a water-soluble inorganic acid, a $C_1$–$C_4$ carboxylic acid or a $C_2$–$C_{12}$ dicarboxylic acid.

4. The method according to claim 3 wherein said acidic material is acetic acid.

5. The method according to claim 1 wherein the mixture has a pH of about 6–8.

6. The method according to claim 1 wherein said slurry containing the aggregated polymer is heated to a temperature of about 65°–85° C.

7. The method of isolating poly(2-vinylpyridine-co-styrene) from an aqueous emulsion thereof which comprises mixing said aqueous emulsion with acetic acid at a concentration such that the mixture has a pH of about 6–8 to aggregate the copolymer, and heating the resulting slurry containing the aggregated copolymer to a temperature of abut 70°–80° C. for about 10–120 minutes to increase the size of the aggregated particles.

* * * * *